(12) United States Patent
Jones et al.

(10) Patent No.: US 8,060,732 B2
(45) Date of Patent: Nov. 15, 2011

(54) MULTIPLE PURPOSE INTEGRATED CIRCUIT

(75) Inventors: Andrew Michael Jones, Bristol (GB); Stuart Andrew Ryan, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 915 days.

(21) Appl. No.: 11/787,227

(22) Filed: Apr. 13, 2007

(65) Prior Publication Data

US 2007/0283140 A1    Dec. 6, 2007

(30) Foreign Application Priority Data

Apr. 13, 2006   (EP) .................................... 06252068

(51) Int. Cl.
*G06F 9/00* (2006.01)

(52) U.S. Cl. ................. 713/1; 713/2; 713/189; 713/193

(58) Field of Classification Search ................... 713/1, 2, 713/189, 193
See application file for complete search history.

(56) References Cited

U.S. PATENT DOCUMENTS

| 6,735,696 | B1 | 5/2004 | Hannah | |
|---|---|---|---|---|
| 6,754,784 | B1 | 6/2004 | North et al. | |
| 7,464,256 | B2 * | 12/2008 | Muir | 713/1 |
| 2002/0004905 | A1 * | 1/2002 | Davis et al. | 713/193 |
| 2002/0099949 | A1 | 7/2002 | Fries et al. | |
| 2003/0023871 | A1 * | 1/2003 | Gnanasabapathy et al. | 713/200 |

FOREIGN PATENT DOCUMENTS

| EP | 1 273 996 A2 | 1/2003 |
|---|---|---|
| WO | 01/24012 A1 | 4/2001 |
| WO | 03/090052 A2 | 10/2003 |

* cited by examiner

*Primary Examiner* — Abdelmoniem Elamin
(74) *Attorney, Agent, or Firm* — Lisa K. Jorgenson; Timothy L. Boller; Seed IP Law Group PLLC (57) ABSTRACT

An integrated circuit is operable to execute boot loader code and a boot code from external memory. To provide security so that the CPU does not execute malicious codes, the circuit resets in a restricted mode in which only certain functional units may be connected. In the restricted mode the CPU is only able to fetch boot code from an external memory for transfer to an internal memory. A hash function operates on the fetched boot code to determine whether it is authentic and, if it is determined that the code is authentic the circuit is reset to an unrestricted mode to continue executing from the boot code now stored in the internal memory. Further security is provided by a watchdog timer function which resets the circuit if the boot code is not determined to be authentic within a threshold period of time.

35 Claims, 3 Drawing Sheets

MULTIPLE PURPOSE INTEGRATED CIRCUIT

BACKGROUND OF THE INVENTION

1. Field of the Invention

The present disclosure relates to semiconductor integrated circuits, and in particular to integrated circuits used in devices providing multiple purposes to end users, such as television, audio, Internet access, telephone service and the like.

2. Description of the Related Art

Increasingly, consumer products are being developed as multiple purpose devices. Examples include using mobile telephones to function as MP3 players, cameras & radios, using portable storage devices as media players and using television "set top boxes" as devices to access the Internet and provide telephone services. In such devices, the different purposes can be provided by different integrated circuits, or increasingly by multiple purpose integrated circuits.

Integrated circuits (computer chips) that support digital television often have extensive mechanisms for protecting encrypted data against viewing or distribution by or to devices that are not entitled to do so. These "conditional access" systems employ a significant amount of hardware to protect these systems against attack by persons wanting to view, distribute or sell systems that can circumvent security for third parties.

There are two conventional approaches to providing security in the boot phase of integrated circuits. In a first, simple approach, the integrated circuit itself stores all the boot code in internal memory. This on chip code is trusted and is then used to load and authenticate further code in external memory. The disadvantage of this approach is the need to store the boot code in internal memory which uses space on the circuit. In a second approach, the boot loader code is stored in the circuit as part of a cryptocore. The cryptocore is arranged to verify code stored in external memory before it is executed. The disadvantage of this approach is the need for significant hardware.

BRIEF SUMMARY OF THE INVENTION

We have appreciated the need to securely boot computer chips used in applications requiring secure operation, such as those discussed above. We have further appreciated the need to provide such security whilst also allowing ease of manufacture, minimizing silicon area required and simplifying the design cycle.

An embodiment of the invention allows a chip to boot securely using a standard flash chip in a manner which is resistant to re-programming or flash replacement. By using off chip memory for storing boot loader code and boot code, the silicon area on chip can be minimized. By implementing a secure code checking process, using a cryptographic hash function or the like, the boot code in off chip memory may be securely checked before the chip uses the boot code in an unrestricted mode. The hash function is implemented in hardware and is separate from the CPU of the chip to prevent this function from being "spoofed" by use of malicious code. The chip itself operates in a restricted mode initially until the boot code is checked. The restricted mode may ensure that no operations can be performed other than loading the boot code. When the boot code has been authenticated by the hash function, the CPU executes the authenticated boot code that has been transferred to the internal memory. An embodiment of the invention can be implemented in a variety of different chips. One application is in a chip used for both cable modem and conditional access television purposes.

A difference between the known approaches and an embodiment of the present invention is that the known approaches aim to prevent the CPU from ever executing unauthenticated code during the boot phase. Consequently, security is guaranteed because the CPU has not executed any un-authenticated instructions. In contrast, the present invention allows a chip embodying the invention to boot from un-authenticated code (boot loader code). However, the chip hardware is set to a restricted access mode in which it is effectively useless for anything other than loading code into a specified place in internal memory. The boot loader code could thus contain any instructions, but the chip will only operate correctly in a "normal mode" if the boot code fetched to internal memory passes a security check.

In one aspect, an integrated circuit operable to execute code stored in an external memory comprises a processor operable to execute bootloader code from the external memory in a restricted mode of the circuit in which boot code stored in the external memory may be transferred from the external memory to an internal memory but at least some other functions of the circuit are restricted, a hasher separate from the processor arranged to derive a digest value from the boot code transferred to the internal memory, a reference store storing a reference value and a comparator configured to compare the digest value with the reference value and, when the digest value and reference value match, to assert a signal allowing the circuit into an unrestricted mode and causing the CPU to execute the boot code stored in the internal memory. In one embodiment, the circuit is configurable to implement the restricted mode by limiting functional units which may communicate. In one embodiment, the integrated circuit further comprises an interconnect which, in the restricted mode, constrains which functional units may initiate transactions. In one embodiment, the interconnect, in the restricted mode, constrains the targets to which the CPU may issue requests. In one embodiment, the interconnect, in restricted mode, allows requests to an external memory interface coupled to the external memory, and to the internal memory. In one embodiment, the hasher is configured to derive the digest value from the boot-code transferred to the internal memory and from one or more of the address or operation fields of requests to the internal memory. In one embodiment, the hasher is configured to employ a cryptographic hash function. In one embodiment, the integrated circuit further comprises a timer arranged to assert a system reset signal if the comparator does not determine a match between the digest value and reference value in a threshold time period. In one embodiment, the system reset signal causes the circuit to execute the boot loader code in the restricted mode. In one embodiment, the hasher is implemented as part of an interconnect.

In one aspect, a system comprises an external memory and an integrated circuit having an internal memory, a processor operable to execute bootloader code from the external memory in a restricted mode of the integrated circuit in which boot code stored in the external memory may be transferred from the external memory to the internal memory but at least some other functions of the integrated circuit are restricted, a hasher separate from the processor arranged to derive a digest value from the boot code transferred to the internal memory, a reference store storing a reference value, and a comparator configured to compare the digest value with the reference value and, when the digest value and reference value match, to assert a signal causing the CPU to execute the boot code stored in the internal memory and to exit the restricted mode of operation. In one embodiment, the system is configured to allow access to content data on a conditional basis. In one embodiment, the system is configured as a set top box. In one embodiment, the system further comprises a timer configured to assert a system reset signal when the comparator does not determine a match between the digest value and reference value in a threshold time period. In one embodiment, the integrated circuit further comprises an interconnect.

In one aspect, a method of loading boot code in an integrated circuit comprises placing the integrated circuit in a restricted function mode, retrieving boot code from an external memory, storing the boot code in an internal memory, when a boot code authentication criteria is satisfied, taking the integrated circuit out of the restricted function mode and causing a processor in the integrated circuit to execute the boot code stored in the internal memory, and when the boot code authentication criteria is not satisfied, resetting the integrated circuit. In one embodiment, the boot code authentication criteria comprises completing an authentication process within a threshold period of time. In one embodiment, the authentication process comprises deriving a digest value from the boot code stored in the internal memory and comparing the digest value to a reference value. In one embodiment, placing the integrated circuit in a restricted function mode comprises limiting communications between functional units of the integrated circuit.

In one aspect, an integrated circuit comprises means for selectively restricting functionality of the integrated circuit, means for retrieving boot code from an external memory and storing the boot code in an internal memory, means for determining whether the boot code stored in the internal memory satisfies an authentication criteria, and means for causing execution of the boot code stored in the internal memory and enabling unrestricted functionality when the authentication criteria is satisfied and for resetting the integrated circuit when the authentication criteria is not satisfied. In one embodiment, the means for determining comprises a clock. In one embodiment, the means for determining comprises a hasher and a comparator.

BRIEF DESCRIPTION OF THE SEVERAL VIEWS OF THE DRAWINGS

An embodiment of the invention will now be described, by way of example only, and with reference to the accompanying figures, in which.

DESCRIPTION OF THE INVENTION

The invention may be embodied in an integrated circuit used in a variety of different devices used for multiple purpose applications. In embodiments, each purpose may be a different service or function provided to an end user, such as telephone, video, audio, Internet access and so on. One preferred embodiment relates to an integrated circuit providing two functions: cable modem and television. The embodying device is a conditional access unit commonly referred to as a "set top box", that is a device that provides access to broadcast services, such as television, only if various conditions are met.

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-TV. In this context, broadcast can include over-air, via satellite, by cable or indeed any appropriate distribution medium in which the same signal content is sent to many recipients. Television signals may be analogue signals or digital signals. The term "scrambling" is often used for the process of rendering analogue signals unusable until "descrambled", whereas the terms "encryption" and "decryption" are more often used for digital signals. In either case, the aim is to only allow users that have paid a subscription to descramble/decrypt the signals.

Figure 1:
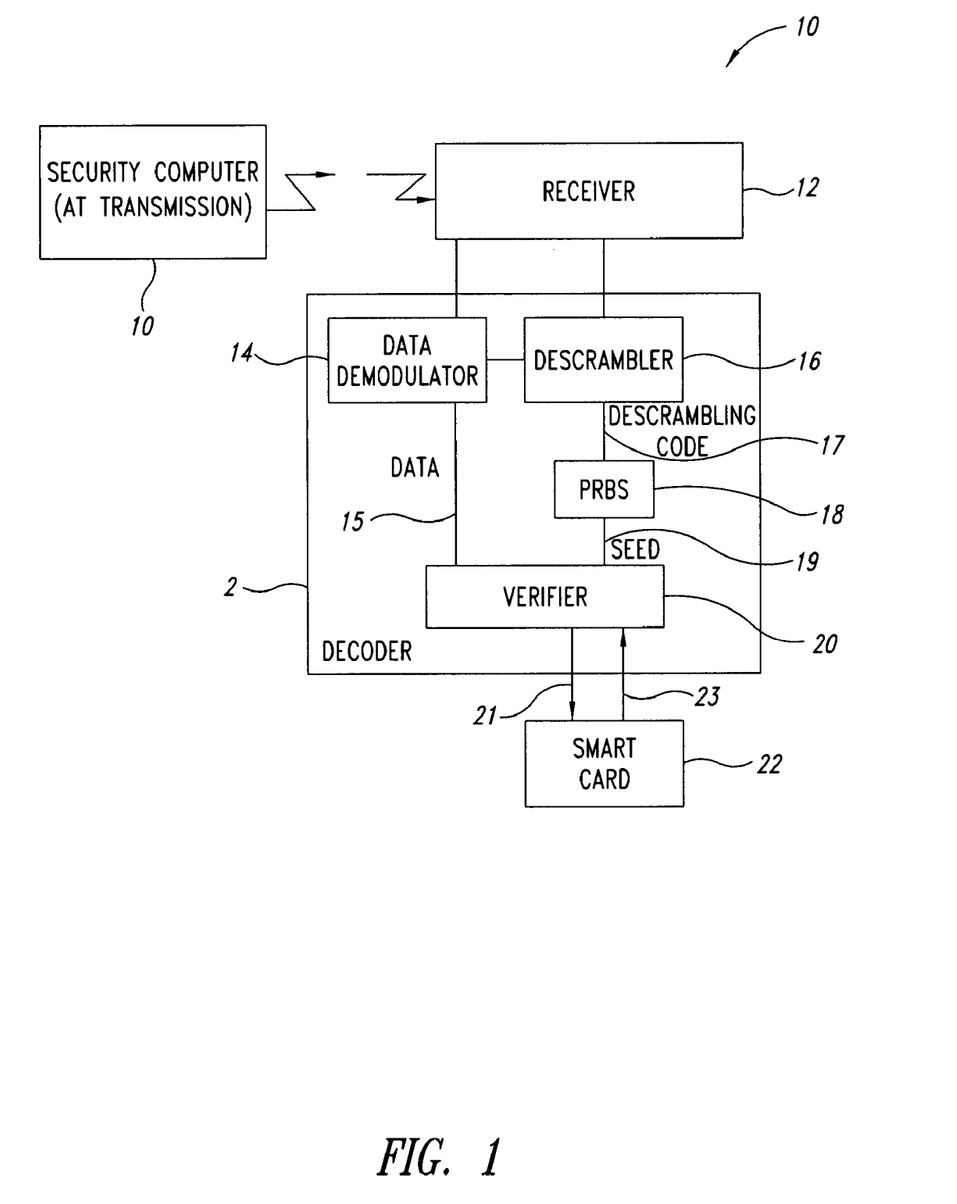
FIG. 1 shows a system with a conditional access television device (set top box) in which embodiments of the invention may be implemented.

An example system 10 including a receiver 12 in which the invention may be embodied is illustrated in FIG. 1. The concept in this system is to broadcast signals (by cable) which can be received by anyone, but only rendered usable by recipients having a "set top box" decoder 2 and an associated smart card 22. The decoders 2 of all recipients are typically identical, but the smart cards 22 contain unique secrets, including entitlements, which specify which channels within the broadcast signals the user is permitted to watch. The system operates broadly as follows.

A television signal is broadcast over air in a scrambled form and includes a stream of control data describing how the television signal is to be descrambled. The television signals and control data are necessarily the same signal sent to all users. It is not feasible to send the signals uniquely scrambled/encrypted to each recipient as there may be tens of millions of users and this would require tens of millions of times the bandwidth. Accordingly, all recipients should be able to operate the same descrambling/decryption process. This is implemented in the decoder 2, which receives the broadcast signals from a receiver 12. A data demodulator 14 extracts the portion of the signal for picture and/or sound and provides this to a descrambler 16 for descrambling. The control data portion is extracted and provided to a verifier 20 over line 15. The control data comprises encrypted control words, which are used to instruct the descrambler how to descramble the picture/sound signal. The control words must therefore be decrypted, and it is for this purpose that the smart card 22 is provided.

The verifier 20 provides encrypted control words across an interface along line 21 to the smart card 22. The smart card 22 contains an algorithm, which, if the user is entitled to watch the chosen channel, decrypts the control words and provides them to the verifier 20 via line 23. The verifier 20 passes the decrypted control words to a PRBS 18 over line 19, which in turn provides a descrambling code to the descrambler 16 over line 17. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards themselves can be re-issued to all subscribers. Lastly, to view any channels, a user must pay for "entitlements" which are broadcast over air addressed uniquely to each user and stored in the smart card 22.

The decoder 2 may provide services additional to the descrambling of television signals, such as telephony and cable modem services. As previously explained, this could be implemented by multiple different chips. One preferred embodiment, though, is to implement the functions of the data demodulator 14 and cable modem as a single chip referred to as a "cable modem chip". The functioning of the television descrambler is dependent, though, on the demodulation of the signal and so the embodiment provides flexible isolation of the demodulation and cable modem functions. This allows a robust separation of functions and isolates malfunctions in one partition from another. An embodiment of the invention achieves this with minimal hardware over an optimal integrated non-partitionable implementation.

Figure 2:
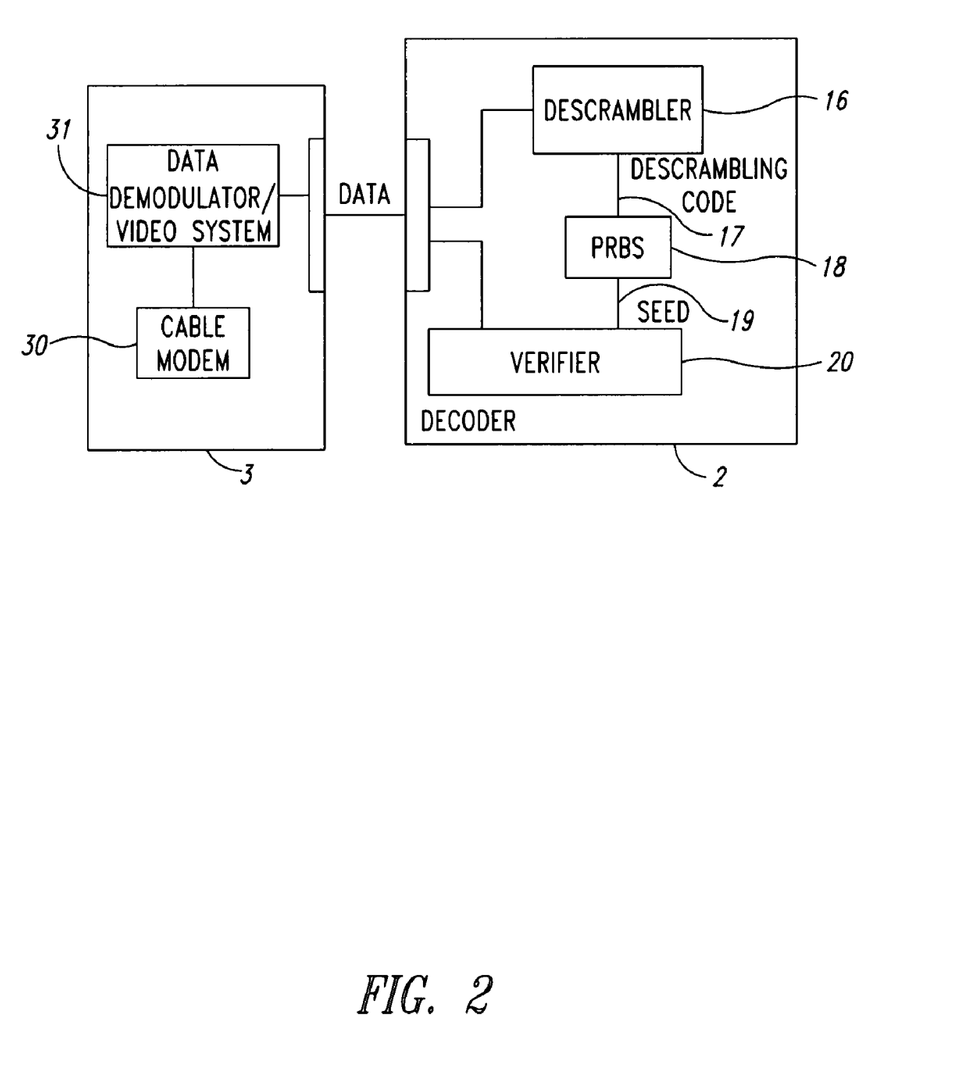
FIG. 2 shows the functional components of an embodiment of an integrated circuit embodying the invention.

An embodiment of a cable modem chip (integrated circuit) 3 embodying the invention is shown in FIG. 2. The integrated circuit 3 comprises a data demodulator unit 31 implemented by QAM (Quadrature Amplitude (de)Modulator) circuits. A cable modem unit 30 provides the functions required to provide Internet connectivity. As can be seen, the demodulation function for the video stream is provided on the cable modem chip 3 and the data transferred to the decoder circuit 2 over an interface. The cable modem chip 3 thus feeds raw data to the decoder chip and provides a front end to services such at the Internet. In the event of failure of the cable modem chip 3, though, the decoder chip 2 would no longer be able to function. This is because the cable modem chip 3 is performing multiple purposes: modem and video.

Figure 3:
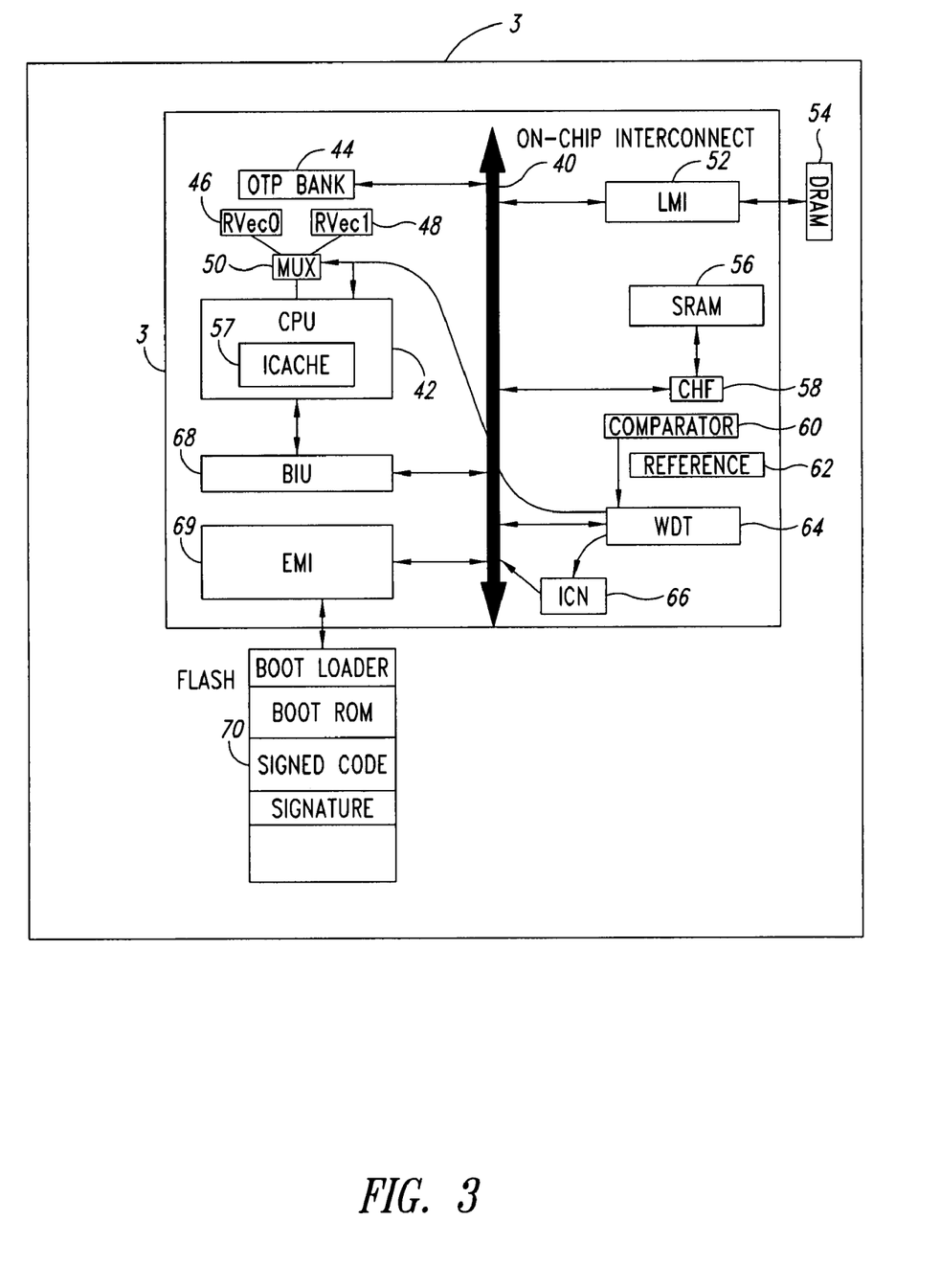
FIG. 3 shows a more detailed view of the functional components of an embodiment of an integrated circuit embodying the invention.

An example arrangement of a cable modem chip embodying the invention and external flash memory for storing boot code is shown in further detail in FIG. 3. As previously stated, embodiments of the invention could apply equally to other types of chip, and the cable modem chip is just one example. The chip 3 comprises a CPU 42 which connects via a bus interface unit BIU 68 to an on-chip interconnect 40. An internal memory in the form of SRAM 56 is used as a store for code executed by the CPU 42. Conventionally, a boot ROM would be provided to store boot loader code and boot code. In contrast, the present embodiment accesses a boot loader code and boot code stored in external memory in the form of flash 70 via an external memory interface EMI 69. As the external memory 70 is inherently insecure, a security mechanism is provided by various functional components on the chip 3.

The security in the chip 3 is provided broadly as follows. The chip 3 starts in a "restricted mode" of operation. In this mode the connectivity between functional units on the chip is restricted during the boot load phase so that only limited connections between units are possible. In particular, the transfer of boot code from the external memory 70 to the internal memory 56 is permitted, but access to other units is denied. The CPU 42 fetches and executes the boot loader code from the external memory 70. This code need not have been authenticated in any way. However, as the chip 3 is operating in a restricted mode, if malicious boot loader code were provided it could not bypass the subsequent security check. The boot loader code causes the boot code to be fetched from the external memory 70 to the internal memory 56. The "restricted mode" is preferably implemented by restricting the connectivity of the interconnect 40 so that only certain units are connected.

The security check is provided by a process here implemented as a hash function CHF 58. This hash function can operate on code as it is fetched from the flash 70 to produce a result for comparison in a comparator 60 with a reference value stored in a reference store 62. If the result of the hash function and the reference value match, then the boot code now stored in the internal memory 56 is executed. As illustrated, the hash function is implemented as a separate hardware unit. It could equally be implemented as part of the interconnect 40 or other part of the circuit. The hash function is separate from the CPU 42. This is because the CPU 42 initially boots from unauthenticated code and so the hash function is secure and independent from the CPU 42. If the hash function were implemented as a function of the CPU 42, a possible attack would be to substitute a pre-computed hash digest value and cause the CPU 42 to provide this to the comparator. The CPU 42 would then not be constrained to operate from authenticated code. Once the security check is passed, the CPU 42 is compelled to execute the authenticated code thus preventing an attack in which authentic code is used to set the chip into an unrestricted mode, and then allowed to execute malicious unauthenticated code.

An addition to the security of the chip 3 is provided by a timer in the form of a WDT 64 which operates to ensure that boot ROM code is successfully checked and is indicated as being authentic within a specific period of time. This can be implemented as a separate hardware unit, or as part of other hardware such as the interconnect. When the WDT receives a signal asserting that the boot code is authentic, it forces the CPU to then execute the authenticated boot code.

The components of an embodiment are now described in greater detail. The CPU 42 is responsible for executing all software. At system reset the CPU will start fetching instructions from fixed address RVec0 46. At manual reset the CPU will start fetching instructions from fixed address RVec1 48. The different addresses on system reset and manual rest enhance security as explained below. The EMI External Memory interface 69 is responsible for accessing the external flash unit 70 during the bootloader sequence. The flash ROM 70 stores the code and data necessary to securely load the application. This includes a boot loader and boot code. The boot code is usually implemented in a boot ROM and so by storing this in external flash, the code can be considered a "virtual boot ROM".

The SRAM 56 is a block of read/writable memory used as a store by the application. During the bootload phase (at least) there is a single target port which is able to access the SRAM contents. This is controlled by the interconnect 40 so as to prevent unauthorized access to the SRAM.

The hash function CHF 58 is provided to maintain a computed digest of all information which has passed through it since system reset. This is integrated with the bus target port of the SRAM 56. The CHF 58 is implemented over the set of bus transactions sent to the SRAM target ports—in particular, the address, data and operation fields of each incoming bus request is presented to the CHF 58. In this way, the CHF 58 maintains a hash digest during the bootload sequence. The hash function could operate just on the boot code data itself without the address and operation fields. However, computing the digest on the data, address and operation fields increases security.

The reference store 62 holds a reference value which is preferably a pre-computed digest of the boot ROM code using the CHF 58. The reference store 62 is a write-only (to software), one-time-programmable register. The reference value is programmed post fabrication of the chip, thus allowing different boot code to be used for different chips. The boot code may therefore be customized for different systems. This allows the boot code to be finalized during chip fabrication giving additional time to agree security details of the chip.

The comparator 60 receives the reference value and the calculated hash digest and asserts a match signal if the running digest is equal to the reference value.

The watchdog timer 64 is configured to count down from a preset value to zero from system reset. If the count reaches zero the watchdog timer will issue a system reset. The count may be stopped by writing a special stop value into the WDT control register when the match signal is asserted. If the count is stopped the WDT will cause a manual reset of the CPU and cause the interconnect to transition to its normal mode of operation.

The OTP bank 44 is a small set of read/writable-once registers. This set optionally holds keys and product information which may be specified after silicon manufacture. The LMI Local Memory interface 52 is the functional unit responsible for accessing DRAM 54.

The interconnect 40 is an on-chip unit responsible for enabling on-chip modules to communicate using a shared address space. While the WDT 64 is counting down (i.e., during the bootloading phase) the interconnect functionality is limited to providing connectivity between those blocks which are required to execute the boot loader. So that, for example, it will not route requests to the LMI; all functional units not involved with the designated bootloader scheme are essentially isolated.

The operation of the chip during a bootload sequence is as follows. At system reset the CPU 42 fetches its first instruction from address RVec0 46 which is mapped to the bottom of external flash memory 70 which is the entry point of the bootloader code. The bootloader is a section of code which is held as plaintext in the flash 70. The bootloader code causes the CPU 42 to fetch the "virtual boot ROM" code (the boot code) from the flash 70. The virtual boot ROM code is optionally encrypted (for example, with a standard technique such as 3DES or AES), if so, the decryption key will be held as part of the OTP bank 44. In either case, the plaintext virtual boot ROM code is placed in the on-chip SRAM 56 by the CPU 42.

During execution of the bootloader code, and while the boot code is transferred to the internal memory, the chip is set to the "restricted mode". This is achieved by setting the interconnect so that:

1. Only the CPU may initiate transactions;
2. The CPU may only issue requests to the following targets: EMI (which drives the flash), the internal SRAM and the WDT.

All other parts of the chip address map cannot be accessed by the CPU.

This may be implemented as follows:
1) all potential interconnect request initiators, apart from the CPU, have their request line gated out in restricted mode.
2) There are at least 3 techniques which may be used to achieve this:
   i. Ineligible targets are forced into a lower power state.
   iii. The grant line of ineligible targets is gated out. Thus preventing them from ever accepting a request.
   iii. Implementing dual address maps in the routing node attached to the CPU. The restricted mode address map would feature a route to ineligible targets.

The technique(s) chosen is a microarchitectural trade-off and would depend on a number of factors including the desired interconnect structure.

When the copy of the boot ROM code (with optional decryption) is complete the CPU 42 writes the WDT 64 stop value to a WDT control register. If the reference value stored in reference store 62 and the digest computed by the CHF match (as determined by the comparator 60), then a CHF match signal is asserted to the WDT 64. The WDT 64 stops counting down and is configured to cause a manual reset of the CPU 42. This manual reset causes the CPU to start fetching instructions from RVec1 48 which is mapped to the top of SRAM—which is the entry point of the (recently placed) boot ROM code. Also, the WDT 64 puts the interconnect 40 into its normal operational mode where all the functional units are addressable. From this point, the CPU may behave exactly as it would have done had it booted from an on-chip boot ROM whose contents are the same as the code now in SRAM. It may use standard authentication, digital signature and encryption techniques to securely load and start the application.

If, however, the WDT 64 count reaches zero, or the stop value is written to the WDT control register when the CHF match signal is not asserted, then the WDT is configured to cause a system reset. The system reset causes the CPU 42 to fetch from RVec0 and the process described above is repeated.

The embodying process thus operates a process to verify that the boot ROM code stored in off chip memory is authenticate (in comparison to a pre-stored value stored on chip). A hardware configuration ensures that the CPU cannot continue to boot from the fetched code if the boot ROM code fetched from the off chip memory is not authentic. The hardware configuration also ensures that the interconnect only allows certain functional components to communicate with one another during the boot sequence, thereby preventing a possible attack in which the CPU 42 is caused to boot from code other than the verified code.

The authentication process uses a hash function to compute a digest of the boot code stored in external memory. The hash function could be any of the set of functions that produces a digest (that is a smaller number of bits) from the boot code for comparison with a pre-stored value. Preferably, the hash function is a cryptographic hash function, such as SHA-1.

Alternatively, an embodiment could, instead of using a strong CHF (such as SHA-1 or SHA-256 etc.), use a member of a weaker hash function family provided the function parameters are secret. One could use CRC with a secret seed value and secret polynomial (N.B. held in s/w write-only OTP). CRC uses a trivial amount of hardware to compute (essentially a linear feed back shift register LFSR). Generating a collision for a CRC over a message when the CRC has unknown parameters and the CRC digest itself is unknown is hard and so provides good security.

In an alternative embodiment, instead of using SRAM 56, the bootloader would write code directly into the ICACHE 57 of the CPU. In this variation the CHF would be computed on the address data and operation of all accesses to the ICACHE array and cache RAM area. This may be effected by placing a CHF block in the monitor of the security trace of the data being transferred to the ICACHE. For the avoidance of doubt, it is noted that the SRAM and ICACHE are both forms of memory internal to the chip.

One preferred implementation of the "restricted mode" is to use the interconnect to control which functional units (also known as targets) may communicate with one another. An alternative approach would be to modify the CPU core to prevent execution outside a given area in the restricted mode. However, this approach is more complicated because it is generally simpler to modify the interconnect.

It could be possible to remove the WDT timer function and instead use an interconnect controller. This relies on the fact that the hardware guarantees that the only way of putting the chip into a normal operation mode is to generate a CHF match signal. The interconnect controller could also trigger the manual reset. A timer function in some form is generally a better choice, though, to prevent the chip becoming indefinitely set in the restricted mode allowing a security attack by repeated attempts at generating the correct hash digest value. The timer effectively ensures that the chip resets after a given period if it is still in the restricted mode, thereby preventing a repeated attack on the security.

An alternative embodiment implements the security aspects purely implemented within the interconnect. In this embodiment, the CHF function is built into the on-chip bus nodes in order to authenticate a sequence of bus transactions prior to forcing the CPU to reboot to a known location. An advantage of this approach is that it can be easily retrofitted to any system requiring this type of security. A further advantage is that (apart from the machinery in the interconnect) there is no additional security hardware required elsewhere in the system to provide this level of security. Or, put another way, the security upgrade is achieved with minimal architectural disruption to an original design.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An integrated circuit operable to execute code stored in an external memory, comprising:
   a processor operable to execute bootloader code from the external memory in a restricted mode of the circuit in which boot code stored in the external memory may be transferred from the external memory to an internal memory but at least some other functions of the circuit are restricted;
   a hasher separate from the processor and configured to derive a digest value from the boot code transferred to the internal memory;
   a reference store storing a reference value; and
   a comparator configured to compare the digest value with the reference value and, when the digest value and reference value match, to assert a signal allowing the circuit into an unrestricted mode and causing the CPU to execute the boot code stored in the internal memory, wherein the circuit is configured to implement the restricted mode by limiting functional units which may communicate.

2. An integrated circuit according to claim 1, further comprising an interconnect which, in the restricted mode, constrains which functional units may initiate transactions.

3. An integrated circuit according to claim 2 wherein the interconnect, in the restricted mode, constrains the targets to which the CPU may issue requests.

4. An integrated circuit according to claim 3 wherein the interconnect, in restricted mode, allows requests to an external memory interface coupled to the external memory, and to the internal memory.

5. An integrated circuit operable to execute code stored in an external memory, comprising:
   a processor operable to execute bootloader code from the external memory in a restricted mode of the circuit in which boot code stored in the external memory may be transferred from the external memory to an internal memory but at least some other functions of the circuit are restricted;
   a hasher separate from the processor and configured to derive a digest value from the boot code transferred to the internal memory and from one or more of address or operation fields of requests to the internal memory;
   a reference store storing a reference value; and
   a comparator configured to compare the digest value with the reference value and, when the digest value and reference value match, to assert a signal allowing the circuit into an unrestricted mode and causing the CPU to execute the boot code stored in the internal memory.

6. An integrated circuit according to claim 5 wherein the hasher is configured to employ a cryptographic hash function.

7. An integrated circuit operable to execute code stored in an external memory, comprising:
   a processor operable to execute bootloader code from the external memory in a restricted mode of the circuit in which boot code stored in the external memory may be transferred from the external memory to an internal memory but at least some other functions of the circuit are restricted;
   a hasher separate from the processor and configured to derive a digest value from the boot code transferred to the internal memory;
   a reference store storing a reference value;
   a comparator configured to compare the digest value with the reference value and, when the digest value and reference value match, to assert a signal allowing the circuit into an unrestricted mode and causing the CPU to execute the boot code stored in the internal memory; and
   a timer configured to assert a system reset signal if the comparator does not determine a match between the digest value and reference value in a threshold time period.

8. An integrated circuit according to claim 7 wherein the system reset signal causes the circuit to execute the boot loader code in the restricted mode.

9. An integrated circuit according to claim 1 wherein the hasher is implemented as part of an interconnect.

10. A system comprising:
    an external memory; and
    an integrated circuit having:
       an internal memory;
       a processor operable to execute bootloader code from the external memory in a restricted mode of the integrated circuit in which boot code stored in the external memory may be transferred from the external memory to the internal memory but at least some other functions of the integrated circuit are restricted;
       a hasher separate from the processor arranged to derive a digest value from the boot code transferred to the internal memory;
       a reference store storing a reference value; and
       a comparator configured to compare the digest value with the reference value and, when the digest value and reference value match, to assert a signal causing the CPU to execute the boot code stored in the internal memory and to exit the restricted mode of operation, wherein the integrated circuit is configured to implement the restricted mode by limiting functional units which may communicate.

11. The system of claim 10 wherein the system is configured to allow access to content data on a conditional basis.

12. The system of claim 10 wherein the system is configured as a set top box.

13. A system comprising:
    an external memory; and
    an integrated circuit having:
       an internal memory;
       a processor operable to execute bootloader code from the external memory in a restricted mode of the integrated circuit in which boot code stored in the external memory may be transferred from the external memory to the internal memory but at least some other functions of the integrated circuit are restricted;

a hasher separate from the processor and configured to derive a digest value from the boot code transferred to the internal memory;

a reference store storing a reference value;

a comparator configured to compare the digest value with the reference value and, when the digest value and reference value match, to assert a signal causing the CPU to execute the boot code stored in the internal memory and to exit the restricted mode of operation; and a timer configured to assert a system reset signal when the comparator does not determine a match between the digest value and reference value in a threshold time period.

14. The system of claim 10 wherein the integrated circuit further comprises an interconnect.

15. A method of loading boot code in an integrated circuit, the method comprising:

placing the integrated circuit in a restricted functions mode, wherein communications between functional units of the integrated circuit are limited;

retrieving boot code from an external memory;

storing the boot code in an internal memory;

when a boot code authentication criteria is satisfied, taking the integrated circuit out of the restricted function mode and causing a processor in the integrated circuit to execute the boot code stored in the internal memory; and when the boot code authentication criteria is not satisfied, resetting the integrated circuit.

16. The method of claim 15 wherein the boot code authentication criteria comprises completing an authentication process within a threshold period of time.

17. The method of claim 16 wherein the authentication process comprises:

deriving a digest value from the boot code stored in the internal memory; and comparing the digest value to a reference value.

18. An integrated circuit, comprising:

means for selectively restricting functionality of the integrated circuit in response to a reset signal, wherein communications between functional units of the integrated circuit are limited;

means for retrieving boot code from an external memory and storing the boot code in an internal memory in response to the reset signal;

means for determining whether the boot code stored in the internal memory satisfies an authentication criteria; and means for causing execution of the boot code stored in the internal memory and enabling unrestricted functionality when the authentication criteria is satisfied and for resetting the integrated circuit when the authentication criteria is not satisfied.

19. The integrated circuit of claim 18 wherein means for determining comprises a clock.

20. The integrated circuit of claim 18 wherein the means for determining comprises a hasher and a comparator.

21. The integrated circuit of claim 20 wherein the hasher is configured to derive a digest value from the boot code stored in the internal memory and from one or more address or operational fields of requests to the internal memory.

22. The integrated circuit of claim 21 wherein the means for determining comprises a timer configured to assert a reset signal when the comparator does not determine a match between the digest value and a reference value in a threshold time period.

23. The integrated circuit of claim 5 wherein the integrated circuit is configured to implement the restricted mode by limiting functional units which may communicate.

24. The integrated circuit of claim 5, further comprising:

a timer configured to assert a system reset signal if the comparator does not determine a match between the digest value and a reference value in a threshold time period.

25. The integrated circuit of claim 7 wherein the circuit is configured to implement the restricted mode by limiting functional units which may communicate.

26. The system of claim 13 wherein the system reset signal causes the integrated circuit to execute the boot loader code in the restricted mode.

27. The system of claim 13 wherein the integrated circuit is configured to implement the restricted mode by limiting functional units which may communicate.

28. The system of claim 13 wherein the hasher is configured to derive a digest value from the boot code transferred to the internal memory and from one or more address or operational fields of requests to the internal memory.

29. The method of claim 16 wherein the authentication process comprises:

deriving a digest value from the boot code stored in the internal memory and from one or more of address or operational fields of requests to the internal memory; and comparing the digest value to a reference value.

30. The integrated circuit of claim 5, further comprising:

an interconnect configured to selectively restrict flinctional units from initiating transactions.

31. The integrated circuit according to claim 7, further comprising an interconnect which, in the restricted mode, constrains which functional units may initiate transactions.

32. The system of claim 14 wherein the interconnect is configured to, in the restricted mode, constrain which flinctional units may initiate transactions.

33. The system of claim 13 wherein the integrated circuit comprises an interconnect which, in the restricted mode, constrains which functional units may initiate transactions.

34. The method of claim 15, further comprising:

selectively constraining, in the restricted mode of operation and via an interconnect, initiations of trans actions by functional units.

35. The integrated circuit of claim 18 wherein the means for selectively restricting flinctionality of the integrated circuit comprises an interconnect configured to constrain which functional units may initiate transactions.

* * * * *

UNITED STATES PATENT AND TRADEMARK OFFICE
CERTIFICATE OF CORRECTION

| | | |
|---|---|---|
| PATENT NO. | : 8,060,732 B2 | |
| APPLICATION NO. | : 11/787227 | |
| DATED | : November 15, 2011 | |
| INVENTOR(S) | : Andrew Michael Jones et al. | |

It is certified that error appears in the above-identified patent and that said Letters Patent is hereby corrected as shown below:

<u>Column 11, Line 21, Claim 15:</u>
"placing the integrated circuit in a restricted functions" should read, --placing the integrated circuit in a restricted function--.

<u>Column 12, Line 39, Claim 30:</u>
"an interconnect configured to selectively restrict flinctional" should read, --an interconnect configured to selectively restrict functional--.

<u>Column 12, Line 45, Claim 32:</u>
"configured to, in the restricted mode, constrain which flinctional units may initiate transactions" should read, --configured to, in the restricted mode, constrain which functional units may initiate transactions--.

<u>Column 12, Line 52, Claim 34:</u>
"and via an interconnect, initiations of trans actions by functional units" should read, --and via an interconnect, initiations of transactions by functional units--.

<u>Column 12, Line 55, Claim 35:</u>
"for selectively restricting functionality of the integrated circuit" should read, --for selectively restricting functionality of the integrated circuit--.

Signed and Sealed this
Twenty-seventh Day of March, 2012

David J. Kappos
*Director of the United States Patent and Trademark Office*